United States Patent
Kraemer et al.

(10) Patent No.: US 7,824,636 B1
(45) Date of Patent: Nov. 2, 2010

(54) MODEL-BASED TUNING OF AMMONIA DISTRIBUTION AND CONTROL FOR REDUCED OPERATING COST OF SELECTIVE CATALYTIC REDUCTION

(75) Inventors: Gilbert Otto Kraemer, Greer, SC (US); Garth Curtis Frederick, Greenville, SC (US)

(73) Assignee: General Electric Company, Schnectady, NY (US)

( * ) Notice: Subject to any disclaimer, the term of this patent is extended or adjusted under 35 U.S.C. 154(b) by 0 days.

(21) Appl. No.: 12/508,604

(22) Filed: Jul. 24, 2009

(51) Int. Cl.
*B01D 53/56* (2006.01)
*G05D 7/00* (2006.01)
*G05D 11/00* (2006.01)

(52) U.S. Cl. .............. 423/239.1; 423/DIG. 5; 422/108; 422/111

(58) Field of Classification Search .............. 423/239.1, 423/DIG. 5; 422/108, 111, 168, 177, 180
See application file for complete search history.

(56) References Cited

U.S. PATENT DOCUMENTS

| | | | |
|---|---|---|---|
| 4,751,054 A * | 6/1988 | Watanabe | .................... 422/111 |
| 4,893,468 A | 1/1990 | Hines | |
| 5,364,606 A | 11/1994 | Hung | |
| 6,471,506 B1 | 10/2002 | Zamansky et al. | |
| 6,694,900 B2 | 2/2004 | Lissianski et al. | |
| 7,320,781 B2 * | 1/2008 | Lambert et al. | .......... 423/239.1 |
| 7,374,736 B2 | 5/2008 | Payne et al. | |
| 7,399,729 B2 | 7/2008 | Rocha et al. | |
| 7,459,135 B2 | 12/2008 | Pieterse et al. | |
| 7,462,340 B2 | 12/2008 | Schwefer et al. | |
| 2002/0182127 A1 * | 12/2002 | Braun et al. | ................. 422/172 |
| 2010/0061907 A1 * | 3/2010 | Sun et al. | ................. 423/239.1 |

FOREIGN PATENT DOCUMENTS

JP 2-063524 A * 3/1990

* cited by examiner

*Primary Examiner*—Timothy C Vanoy
(74) *Attorney, Agent, or Firm*—Nixon & Vanderhye P.C.

(57) ABSTRACT

A method and system for reducing the amount of nitrogen oxides ($NO_x$) in a combustion gas waste stream by (1) analyzing the waste stream to determine the amount of $NO_x$; (2) determining the stoichiometric amount of ammonia required to reduce the $NO_x$ concentration down to a required level or less; (3) determining the flow rate profile of $NO_x$ components across the combustion gas waste stream upstream of an ammonia injection grid; (4) selecting specific locations within the ammonia injection grid to activate ammonia valves; (5) injecting controlled amounts of ammonia vapor into the gas stream at grid locations corresponding to the location of $NO_x$ in the gas stream; and (6) treating the gas stream using a selective catalytic reduction unit to reduce the amount of $NO_x$ down to acceptable levels.

10 Claims, 9 Drawing Sheets

MODEL-BASED TUNING OF AMMONIA DISTRIBUTION AND CONTROL FOR REDUCED OPERATING COST OF SELECTIVE CATALYTIC REDUCTION

BACKGROUND OF THE INVENTION

The present invention relates to processes for reducing the amount of nitrogen oxides in flue gases emitted into the atmosphere from combustion systems and, in particular, to a method for treating nitrogen oxides in combustion gas waste streams using a new method for determining and controlling the precise amount of ammonia necessary to substantially reduce and/or eliminate nitrogen oxide emissions using selective catalytic reduction ("SCR").

Nitrogen oxide compounds form as by-products of the imperfect high-temperature combustion are considered major pollutants emitted by combustion sources. The exhaust gases invariably include nitric oxide (NO) and nitrogen dioxide ($NO_2$) with the total $NO+NO_2$ concentration nominally referred to as "$NO_x$." In recent years, nitrogen oxides have become the subject of increasing public concern due to their potential toxicity. $NO_x$ compositions are also known to be chemical precursors of acid rain or photochemical smog and contribute to the "greenhouse" effect. $NO_x$ also plays a role in forming ground-level ozone associated with asthma and other respiratory ailments.

Thus, $NO_x$ emissions have become the subject of increasingly stringent federal and state regulations limiting the amount permitted in effluent gas vented to the atmosphere. Current in-force pollution control regulations also provide the incentive for industries to find improved, lower cost processes for substantially reducing or eliminating $NO_x$ emissions.

In an ideal combustion gas treatment system, $NO_x$ compounds are distributed uniformly in the exhaust steam and treated with a catalyst to create unregulated compounds (e.g., nitrogen) that can then be released into the atmosphere. In theory, $NO_x$ treatment processes should form stoichiometrically zero $NO_x$ gases leaving the catalyst bed. Unfortunately, various practical limitations prevent the achievement of either uniform $NO_x$ concentrations or zero $NO_x$ emissions in treated exhaust gases. One reason for the lower $NO_x$ conversion efficiencies is the spontaneous partial reaction of ammonia with other compounds present in the exhaust streams when the ammonia is first introduced. The presence of such compounds can result in the inefficient use of ammonia and/or the ineffective reduction of $NO_x$ in the system. In addition, shifts in exhaust stream compositions can cause stoichiometrically incorrect amounts of ammonia to be present, thereby increasing the cost of reducing $NO_x$ to "safe" compounds and creating the possibility that excess ammonia (typically referred to as "ammonia slip") may be released into the atmosphere.

A known process for treating $NO_x$ in exhaust streams uses selective catalytic reduction ("SCR") to reduce $NO_x$ to nitrogen gas using ammonia as the reducing agent. However, because of ammonia's hazardous nature, its use in an SCR system presents additional environmental problems that must be addressed. As federal and state regulatory agencies continue to drive $NO_x$ emission limits down, other regulations have also reduced the permissible levels of $NH_3$ that can be emitted into the atmosphere. The presence of unused ammonia in SCR processes also raises concerns over the overall cost for treating $NO_x$ emissions.

One difficulty in controlling $NH_3$ emissions using SCR relates to the design of heat recovery steam generator ("HRSG") systems used in combined cycle power generation plants. Most HRSG systems have the ability to adapt to changing gas flow rates and/or a non-uniform distribution of exhaust gas components, including $NO_x$. However, HRSG exhaust compositions and temperatures will vary widely depending on the upstream load. Although some SCR processes allow for "tuning" of the ammonia concentration in the HRSG exhaust gas by monitoring the $NO_x$ concentration downstream of the SCR, previous attempts to treat non-uniform concentrations of $NO_x$ in an HRSG flow pattern ("spatial distribution") by adding ammonia before the gas contacts the SCR catalyst have met with very limited success. Thus, difficulties remain in creating and maintaining an adequate spatial distribution of ammonia in exhaust gas flows treated on a continuous basis.

Most combined cycle SCR units operate downstream of a high pressure heat exchanger that reduces the HRSG exhaust gas temperature down to a level of between 600° F. and 750° F. The lower exhaust temperatures range is selected to ensure a high percentage $NO_x$ reduction, low ammonia emissions (ammonia slip), and protect the SCR catalyst from degradation due to exposure over time to high temperatures, e.g., in the 825° F. to 850° F. range, which can cause irreversible damage to the SCR catalyst. Most catalysts useful in reducing $NO_x$ must also operate in the 600° F. and 750° F. range to avoid any oxidation of the ammonia to form additional $NO_x$. Any such reactions forming additional $NO_x$ necessarily increase the amount of ammonia required by the SCR process and reduce the $NO_x$ removal efficiency of the entire system. Lower exhaust gas temperatures also avoid oxidizing sulfur dioxide in the HRSG exhaust to form $SO_3$, which in turn can result in an ammonia sulfate accumulation within the heat recovery steam generator.

Thus, despite some improvements in treating HRSG exhaust gases, a need still exists to maintain a more uniform distribution of ammonia at the SCR inlet in order to reduce the possibility of parasitic reactions or the presence of excess unreacted ammonia following SCR treatment. For a given catalyst and reactor design, the amount of unreacted ammonia being used depends in major part on the exhaust gas temperature, catalyst, exhaust gas flow distribution and the local $NH_3$ to $NO_x$ ratio. For most ammonia-SCR catalysts, optimum high $NO_x$ reduction and low ammonia slip are achieved over a relatively narrow temperature range. Preferably, an SCR control system should reduce the ammonia slip and complete the $NO_x$ destruction by adjusting the $NH_3$ to $NO_x$ ratio based on the exhaust temperature and detected NO to $NO_2$ ratio. If the NO to $NO_2$ ratio falls below some value (typically 1.0), the SCR may not be adequate in size to achieve the required reduction in $NO_x$ emissions.

Another process factor effecting $NO_x$ removal, particularly in treating gas turbine exhausts, relates to age and reactivity of the SCR catalyst. SCR catalysts increase the reaction rate for reducing $NO_x$ to nitrogen in the feed to the SCR without the catalyst being consumed in the reaction. As a result, the equilibrium products for a steady state reaction do not change significantly. $NH_3$ and $NO_x$ diffuse into the catalyst pores and are adsorbed onto active catalyst sites. Nevertheless, catalyst "poisons" or material blocking the pores or site can effectively deactivate catalyst sites over time.

One last environmental concern of current ammonia-based SCR systems involves the use of auxiliary duct burners. The exhaust gases from gas turbine engines contain a significant quantity of heat energy that can be used to generate steam (and then electricity) using a steam turbine. However, if the heat requirement of the system exceeds that available from the gas turbine exhaust alone, many plants now use supplementary firing in the form of a downstream duct burner positioned between the gas turbine and a waste heat boiler. Most duct burner designs mix the turbine exhaust gases with additional fuel in an effort to improve flame stability and ensure a clean combustion with low $NO_x$ emissions. Nevertheless, the presence (or absence) of a duct burner can have significant impact on the ultimate performance of a downstream SCR unit designed to remove all $NO_x$ from the system.

Thus, numerous problems and challenges remain for $NO_x$ emission control of gas turbine engines, including the need to develop a method that maximizes the reduction of $NO_x$ using ammonia as the primary reducing agent in SCR systems while avoiding the use of excess ammonia or the formation of parasitic ammonia reactions that reduce the efficiency of the SCR process by controlling the desired spatial distribution of ammonia to $NO_x$ molar ratio at any operating condition.

BRIEF DESCRIPTION OF THE INVENTION

The present invention provides a new method and system for reducing the amount of nitrogen oxides ($NO_x$) in a combustion gas waste stream such as the exhaust from a gas turbine engine. An exemplary method includes the following steps: (1) analyzing the combustion gas waste stream to determine the amount of $NO_x$ present; (2) determining the stoichiometric amount of ammonia required to reduce the $NO_x$ concentration down to a required level or less using either real time analytical data or a control model based on known and/or predicted data values; (3) determining the flow rate profile (spatial distribution) of the $NO_x$ components across the combustion gas waste stream at a point upstream of an ammonia injection grid; (4) selecting one or more locations within the ammonia injection grid for activating ammonia valves at those locations; (5) injecting a controlled amount of ammonia vapor into the gas stream at the grid locations corresponding to the location of $NO_x$ in the gas stream; and (6) treating the gas stream containing injected ammonia vapor using a selective catalytic reduction unit to reduce the amount of $NO_x$ down to a level of about 5 ppm or less, preferably 2 ppm or below.

An exemplary system for reducing the amount of nitrogen oxides ($NO_x$) in a combustion gas waste stream includes one or more gas analyzers capable of determining the amount and flow rate of $NO_x$ in the combustion gas waste stream; means for determining the total stoichiometric amount of ammonia required to reduce the $NO_x$ in the waste stream down to some level such as of 5 ppm or less; an ammonia injection system sized to transport controlled amounts of ammonia into the injection grid; an ammonia injection grid containing a plurality of injection ports sized to introduce ammonia vapor at prescribed rates and locations into the waste stream; and a selective catalytic reduction unit containing a catalyst capable of reducing $NO_x$ to nitrogen using ammonia.

DETAILED DESCRIPTION OF THE INVENTION

As noted above, the present invention provides a model-based control system for ammonia injected into an exhaust stream to effectively eliminate $NO_x$ compounds in a gas turbine exhaust stream while reducing the amount and cost of ammonia and SCR catalyst used to treat the exhaust feeds. Preferably, the monitoring and control functions are carried out using a microprocessor with suitably configured software capable of reading input data (e.g., gas, temperatures, compositions, and flow rates) and making the process determinations described below.

The basic factors for controlling the amount of ammonia required to eliminate nitrogen oxide emissions using SCR and effectively eliminating ammonia slip downstream of the SCR fall into the following general categories: (1) the SCR gas inlet velocity distribution; (2) variations in SCR gas inlet temperature; (3) the amount and spatial distribution of $NO_x$ loading (the actual or projected $NO_x$ input to the SCR); (4) variations in the amount and distribution of ammonia injected into the exhaust gas using an ammonia injection grid (AIG); and (5) the predicted and actual degradation of the SCR catalyst activity over time. The above five general factors include a number of different sub-factors also identified and discussed below.

1. SCR Gas Inlet Velocity Distribution. In determining the precise amount and location of ammonia to be injected by the AIG into the exhaust gas downstream of the HRSG and upstream of the SCR, the precise flow characteristics of the exhaust gas to be treated must be determined, particularly the composition of gas leaving the HRSG and entering the SCR such as NO and $NO_2$; the total amount of gas entering the SCR in $ft^3$ per minute; the differences, if any, in gas flow rates over a cross section of the HRSG, i.e., a gas velocity profile to determine whether the velocity at the center of the HRSG is the same or different from that near the sidewalls); and the distribution profile (spatial distribution) of specific components in the gas stream entering the SCR (certain compounds may be more concentrated at the edges of the HRSG).

An accurate prediction of the SCR gas inlet velocity distribution can be based on real time empirical data (e.g., ongoing flow measurements) or on predicted ("model") velocity distribution values using past performance data at known operating conditions and gas compositions. The data can include, for example, the gas turbine engine operating conditions (e.g., a percentage of full engine load), the inlet gas conditions (such as the composition, temperature, pressure and humidity of the engine feed), the composition of the hydrocarbon fuel used by the gas turbine engine, the engine exhaust composition and any relevant operational changes to the HRSG (e.g., design modifications that might effect standard flow rates, increase or decrease the exit gas temperature, etc.).

2. SCR Gas Inlet Temperature Variations. A second general factor for controlling the amount and location of ammonia injected in the HRSG exhaust uses data reflecting changes in the gas temperature feed from the HSRG to the SCR. Such temperature changes (increases or decreases) might result from shifts in the amount of heat extracted by the HRSG (e.g., due to changes in flow rates from the gas turbine engine), or to measured differences in the exhaust stream temperature upstream of the HRSG, or to the presence or absence of a duct burner operation as described above (which might add additional heat to the gas being used downstream in the HRSG).

3. Variations in Ammonia Feed to the SCR. The amount of ammonia fed to the SCR using an AIG may vary over time, depending on various sub-factors, such as the amount of actual or predicted fouling in the injection grid; changes in orifice size of the AIG injection ports effecting the ammonia flow rates (due to erosion, fouling or corrosion); and the quality of the ammonia feed itself (e.g., the presence or absence of contaminants in the liquid ammonia or air feed).

4. SCR $NO_x$ Loading Factors. A fourth set of data points that may effect the amount of ammonia necessary to effectively eliminate nitrogen oxide contaminants without causing ammonia slip involves the amount of NO and $NO_2$ in the HRSG exhaust as it enters the SCR. As discussed above, the measured (or predicted) volume and weight ratios of $NO_x$ components may change over time, depending on the operating characteristics of the gas turbine engine, the fuel being consumed by the engine, changes in engine design, etc. The $NO_x$ loading to the SCR could also be different if the system includes a duct burner as described above downstream of the HRSG that changes the feed to the SCR, e.g., adding NO and $NO_2$ constituents that must also be treated by the SCR. Duct burner could add the NO and $NO_2$ in a non uniform spatial distribution before the ammonia injection grid.

5. SCR Catalyst Type and Degradation. A fifth factor in controlling the ammonia feed to the SCR concerns the rate at which the catalyst composition degrades over time. The degradation rate may even increase over time, depending on the operating conditions of the gas turbine engine and HRSG. Again, the use of this factor in determining and controlling the ammonia injection by the AIG may be based either on real time empirical data or model predictions of the amount and rate of catalyst degradation.

In applying the above control factors, the principal reactions using $NH_3$ to reduce $NO_x$ to nitrogen and water over an SCR catalyst are as follows:

$$4NO+O_2+4NH_3 \rightarrow 4N_2+6H_2O \text{ (fast)}$$

$$NO+NO_2+2NH_3 \rightarrow 2N_2+3H_2O \text{ (fast; with } NO/NO_2 \geq 1.0\text{)}$$

$$6NO_2+8NH_3 \rightarrow 7N_2+12H_2O \text{ (slow)}$$

The first reaction with NO is the dominant "fast" reaction for $NO_x$ removal assuming that the exhaust gas comprises mostly nitrogen oxide. The second reaction can be higher and be the predominate reaction when the mole ratio of NO to $NO_2$ is higher than 1.0, for given SCR catalysts. Higher molar ratios of $NO_2$ undergo reduction in a much slower reaction requiring a higher space velocity and longer catalytic reactor bed. The third reaction requires ⅓ more ammonia to reduce the $NO_2$ as compared to the second reaction and thus increases the total ammonia consumption over the same time period.

If the operating conditions of the SCR unit (such as the exhaust gas flow rate into the SCR, gas temperature, ammonia feed rate, etc.) are not carefully monitored and controlled, a distinct possibility exists that parasitic reactions will occur over the catalyst, including the following:

$$4NH_3+5O_2 \rightarrow 4NO+6H_2O \text{ (Produces NO)}$$

$$2SO_2+O_2 \rightarrow 2SO_3 \text{ (An unwanted precursor reaction)}$$

$$2NH_3+SO_3+H_2O \rightarrow (NH_4)_2SO_4 \text{ (Fouls the SCR unit)}$$

$$NH_3+SO_3+H_2O \rightarrow (NH_4)SO_4 \text{ (Fouls the SCR unit)}$$

The above parasitic reactions illustrate how the composition of gas streams undergoing treatment can be a significant, if not controlling, factor in determining the life span and predicted activity level of SCR catalysts.

Other SCR catalyst factors effecting control of the ammonia feed include the residence time required to reduce the $NO_x$ as a function of the diffusion rate of reactants, the total number of catalyst sites, the concentration of the reactants, the reaction temperature in the SCR, the number of active catalytic sites per unit of geometric surface area, the total geometric surface area and overall reaction rate. For a given set of operating conditions and specific SCR catalyst, the residence time of the treated gas can also change depending on gas velocity and the total catalyst volume (commonly defined as the "space velocity"), i.e., the ratio of the total exhaust gas flow in $ft^3/hr$ divided by the catalyst volume in $ft^3$.

The above control factors also take into account imbalances in the products of combustion, particularly those associated with exhaust streams from gas turbine engines that can result in non-uniform (non-spatial) flow conditions into an SCR. As indicated above, conventional ammonia injection systems do not provide adequate spatial distribution of ammonia in response to changing exhaust stream conditions. As a result, the known designs cannot be easily adjusted (particularly in response to real time analytical data) to accommodate changing $NO_x$ concentration levels. For example, a typical one-time injection of ammonia uses data for the total exhaust load undergoing treatment. The net result is a non-uniform distribution of ammonia during the SCR process and resulting non-uniform conversion of the $NO_x$ constituents.

The present invention thus provides a new method for determining and controlling the spatial injection of ammonia at specific upstream locations prior to treatment in the SCR based on empirical data and/or control models. As such, the invention provides a model-based, and continuously updated, "learning" control system that actuates a plurality of ammonia flow control valves ("tuning valves") in order to provide uniform and controlled ammonia concentrations under variable operating conditions, thereby significantly reducing the cost of eliminating $NO_x$ in the system.

In one embodiment described in the figures below, the control valves are arranged in an AIG or manifold to allow for controlled introduction of ammonia into the system at prescribed flow rates and locations in the grid, depending on current operating conditions and/or amount of $NO_x$ detected at specific locations. The valves are also individually adjustable to control the ammonia flow on a real time basis based on $NO_x$ measurements taken upstream of the SCR system or predicted $NO_x$ concentrations based on known gas turbine operating conditions.

The invention also contemplates using model-based control parameters for the ammonia injection manifold valves that have been calibrated by perturbing (incrementally adjusting) each valve at different locations, monitoring the resulting change in exhaust $NO_x$ from the system, and calculating the optimal $NH_3$ setting to achieve the target exhaust stream reading. Initial control settings can be determined for example during the plant commissioning process. Thereafter, each valve in the manifold can be individually actuated and controlled based on the controller having first "learned" the optimal range of settings as the unit operates under different exhaust stream loads. The various exhaust loads include ambient conditions necessary to meet required $NO_x$ and $NH_3$ emission requirements. The AIG valve control system is also capable of compensating for SCR catalyst degradation over time using a predetermined degradation factor and making ammonia injection adjustments accordingly.

Exemplary SCR catalysts useful in carrying out the invention include combinations of $V_2O_5$, $TiO_2$ and $WO_3$ applied to either a metal monolith substrate or part of a ceramic material in the form of an extruded homogeneous honeycomb. Normally, the SCR unit with the catalyst is located at a point in the gas turbine exhaust where the gas temperature approaches an operating window of between 550° F. and 825° F., depending on the catalyst type. The actual catalyst formulation and support structure can also be specifically designed and/or modified using the above factors to reduce $SO_2$ oxidation, provide somewhat higher temperature durability or minimize any unwanted $NH_3$ oxidation.

The present method is also capable of determining optimal downstream ammonia settings and valve positions during transient operations, such as when the need arises to reduce "yellow plume," namely the visible pollutants emitted from exhaust stacks of a plant when gas turbine engines are first started. Typically, yellow plume occurs when the amount of nitrogen dioxide produced during startup exceeds about 10 parts per million (ppm). Although the start-up gases create a visible yellow discharge, the conditions are normally temporary in duration and dissipate as the gas turbine engines reach normal operating conditions.

Another control variable useful in carrying out the invention involves changes in the duct burner operation that modify the exhaust gas flow into the SCR, resulting in exhaust gas temperature changes or shifts in the amount and distribution of $NO_x$ and unregulated compounds that react with an ammonia feed. The present control model compensates for variations in duct burner operation by monitoring the burner conditions and then altering ("tuning") the ammonia injection grid based on that "learning" model. In a separate embodiment, a zonal reaction model can be employed that takes into account the duct burner mass flow and the effect of changes in exhaust gas temperature at specific locations (zones) in the SCR catalyst bed.

Figure 1:
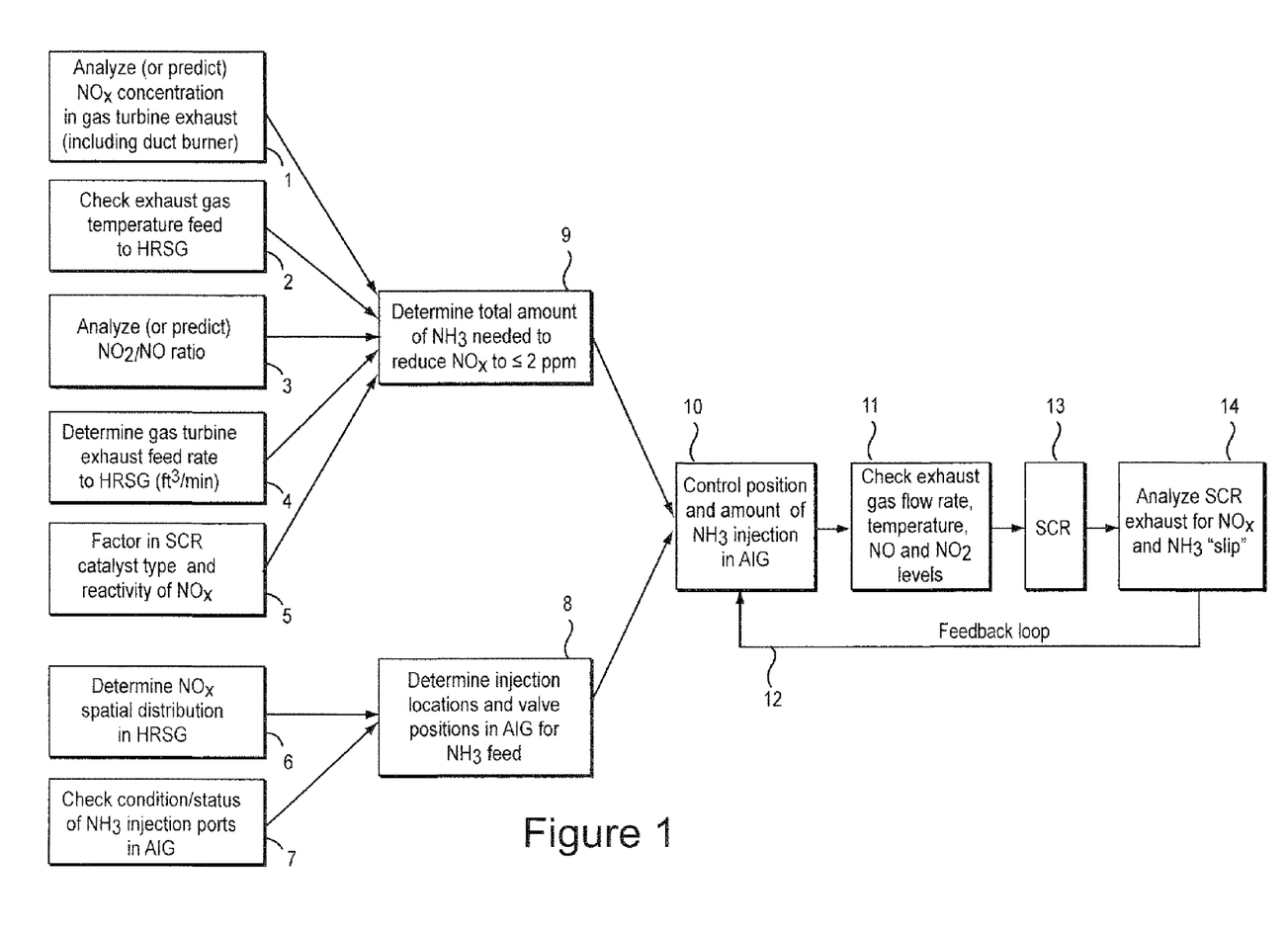
FIG. 1 is a block flow diagram of exemplary process steps according to the invention for monitoring and analyzing turbine exhaust flow conditions and thereafter precisely controlling the amount of ammonia injected into the exhaust stream upstream of the SCR to achieve a uniform spatial distribution of the $NH_3$ and reduce the amount of $NO_x$ in the treated exhaust.

Turning to the figures in the application, FIG. 1 is a block flow diagram of exemplary process steps according to the invention that can be used to monitor and analyze turbine exhaust flow conditions in order to control the amount of ammonia to be injected into the HRSG exhaust stream using an ammonia injection grid (labeled "AIG"). As indicated above, the primary objective is to achieve a uniform spatial distribution of the $NH_3$ and reduce the amount of $NO_x$ in the exhaust stream to a theoretical stoichiometric zero value.

FIG. 1 also reflects an exemplary control model for eliminating ammonia slip downstream of the SCR. The model includes four basic control levels. In the first level, specific data and process information is obtained from various points downstream of the gas turbine engine, namely the composition and flow conditions of the exhaust stream to be treated based on either model-based projections or real time operating data (see the process steps labeled 1 through 7 in the flow diagram of FIG. 1). Typically, it will be necessary at this first level to determine the equilibrium ratio of NO and $NO_2$ in the gas turbine exhaust stream which may change at higher gas turbine exhaust gas temperatures.

At the second level, a determination is made (presumably using a microprocessor and software) of the precise amounts and injections location in the AIG of ammonia necessary to reduce and/or eliminate $NO_x$ to meet or exceed acceptable federal or state emission control standards, e.g., 2 ppm (see steps 8 and 9 in FIG. 1). At the third level, the system operates to evaluate and control the exact amount of ammonia to be injected into the exhaust gas upstream of the SCR unit (see steps 10 and 13). The third level also includes a check of the exhaust stream after the ammonia injection to determine the gas flow rate, temperature, NO and $NO_2$ feeds into the SCR, primarily to assist in evaluating the performance over time of the AIG and SCR units. Level three of FIG. 1 also depicts an exemplary system for providing a final analysis of the exhaust gas downstream of the SCR to determine the reduced $NO_x$ levels (step 14) with a feedback loop 12 to the AIG to modify the ammonia injection if necessary based on detected amounts of residual unreacted ammonia and $NO_x$ in the final exhaust.

With respect to the first control level, FIG. 1 shows various process control parameters used to determine (a) the amount of ammonia necessary to reduce the $NO_x$ levels down to acceptable levels and (b) the most effective location within the exhaust stream for the ammonia injection to take place before the stream enters the SCR. The control factors in the first level include, by way of example, (1) the $NO_x$ concentration (specifically $NO_2$/NO ratio) as analyzed (or predicted) based on the gas turbine engine operating conditions; (2) the exhaust gas temperature feed to the HRSG; (3) the actual (or predicted) $NO_x$ level contributed by a duct burner; (4) the actual (or model-based) feed rate in cubic feet per minute of the gas turbine exhaust feed to the HRSG; (5) information regarding the type of catalyst in the SCR unit, including the actual (or projected) activity level of the catalyst at different gas temperatures; (6) the differences, if any, in the distribution of $NO_x$ components in the gas flow pattern into the AIG (for example, a higher level of $NO_x$ at the edge portions of the feed into the SCR unit); and (7) the status of the ammonia injection ports in the AIG (e.g., the extent to which valves are open or closed).

Figure 2:
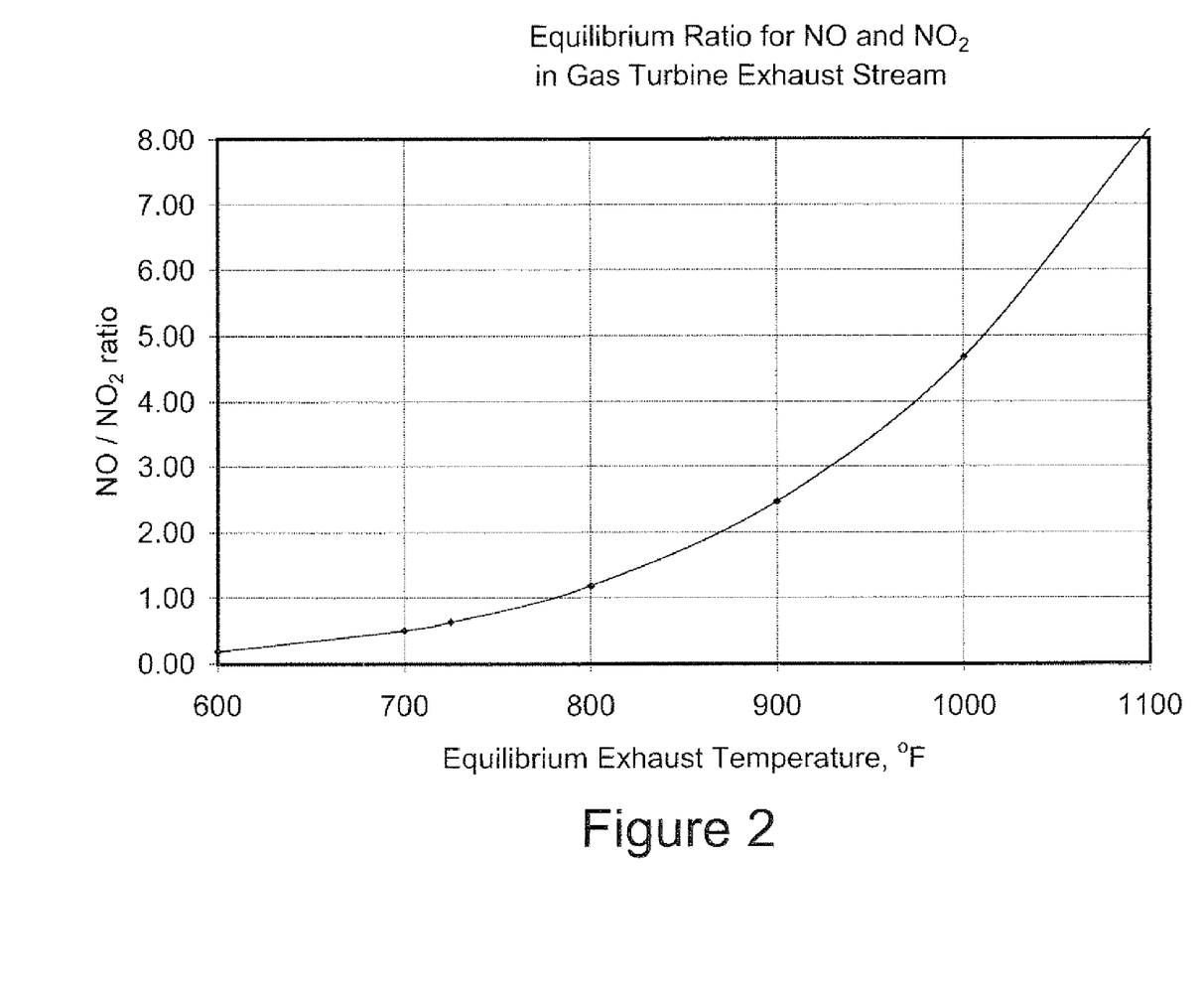
FIG. 2 is a graphical representation of the equilibrium ratio of NO and $NO_2$ in a typical gas turbine exhaust (such as 7FA+e exhaust streams) plotted against equilibrium gas temperature values determined using a standard thermal equilibrium code (STANJAN)

FIG. 2 graphically illustrates the equilibrium ratio of NO and $NO_2$ in a typical gas turbine exhaust (such as 7FA+e exhaust streams), with the $NO/NO_2$ ratio being plotted against equilibrium gas temperature values determined using a standard thermal equilibrium code (STANJAN). In the context of FIG. 2, it has been found that a $NO/NO_2$ ratio above 1.0 would be preferred for SCR systems in accordance with the invention due to the inherent temperature limitations of SCR catalyst systems used to eliminate $NO_x$. That is, the SCR catalyst life could be adversely effected over time (i.e., with reduced activity faster than desired) if the equilibrium temperature of the gas entering the SCR exceeds about 800° F.

Figure 3:
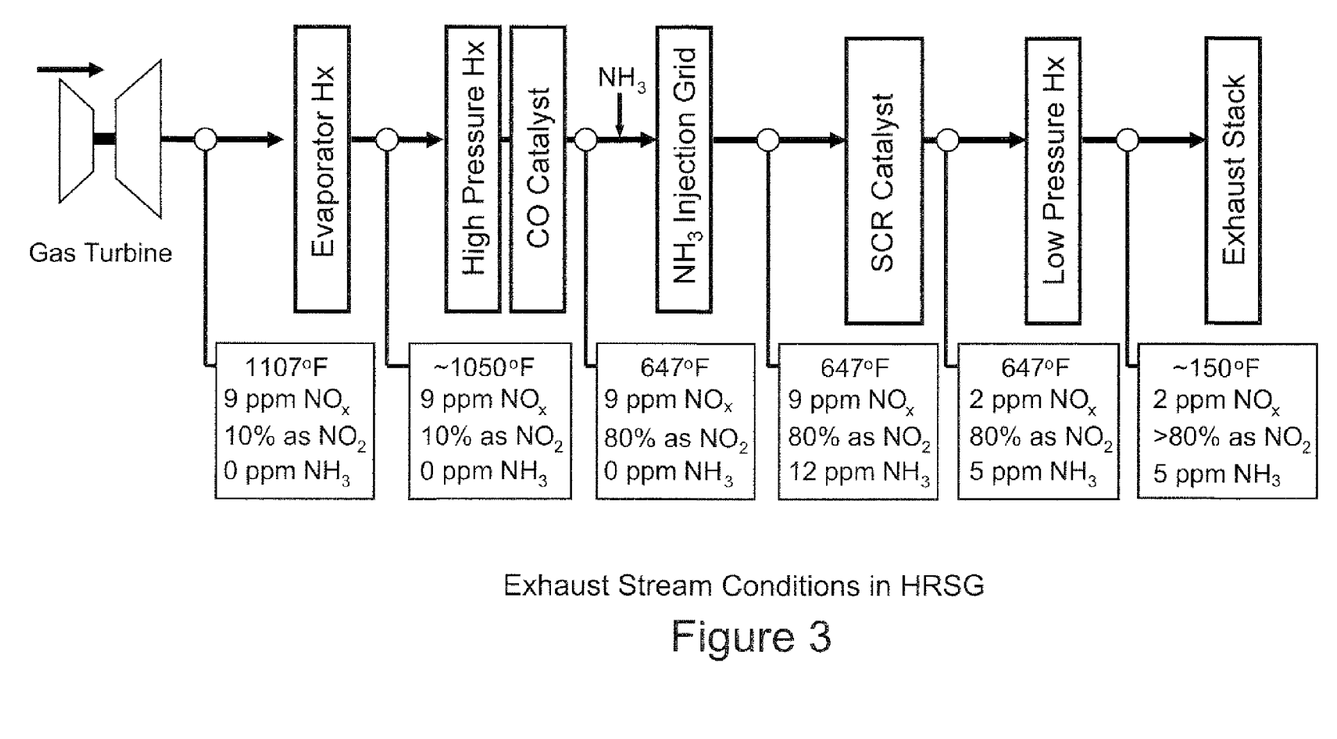
FIG. 3 is a flow chart showing the basic hardware components and resulting $NO_x$ loads for a typical gas turbine exhaust stream by using an SCR catalyst and applying the ammonia injection control factors in accordance with the present invention.

FIG. 3 of the drawings includes a flow chart showing the key hardware components and resulting $NO_x$ loads for a typical gas turbine exhaust stream using an SCR catalyst after applying ammonia injection control factors in accordance with the invention. FIG. 3 also identifies exemplary operating temperatures and compositions as the gas turbine exhaust moves through the system from the engine itself to the exhaust stack, with the changing temperatures and $NO_x$ levels (including the amount of nitrogen dioxide) identified as shown for each stage. Ammonia vapor is shown being added to the system immediately upstream of "$NH_3$ Injection Grid") and before the combined exhaust gas and ammonia stream enter the SCR unit. The SCR reduces the $NO_x$ level down significantly (typically to a level at or below 2 ppm) in order to meet or exceed $NO_x$ emission requirements, with the exit stream from the SCR containing a residual amount of unreacted ammonia (typically 5 ppm or less). As noted above, one objective of the model-based ammonia distribution method according to the invention is to reduce the amount of unreacted ammonia downstream from the SCR, preferably a stoichiometric value approaching zero over time reducing $NH_3$ emissions and operating cost.

Figure 4A:
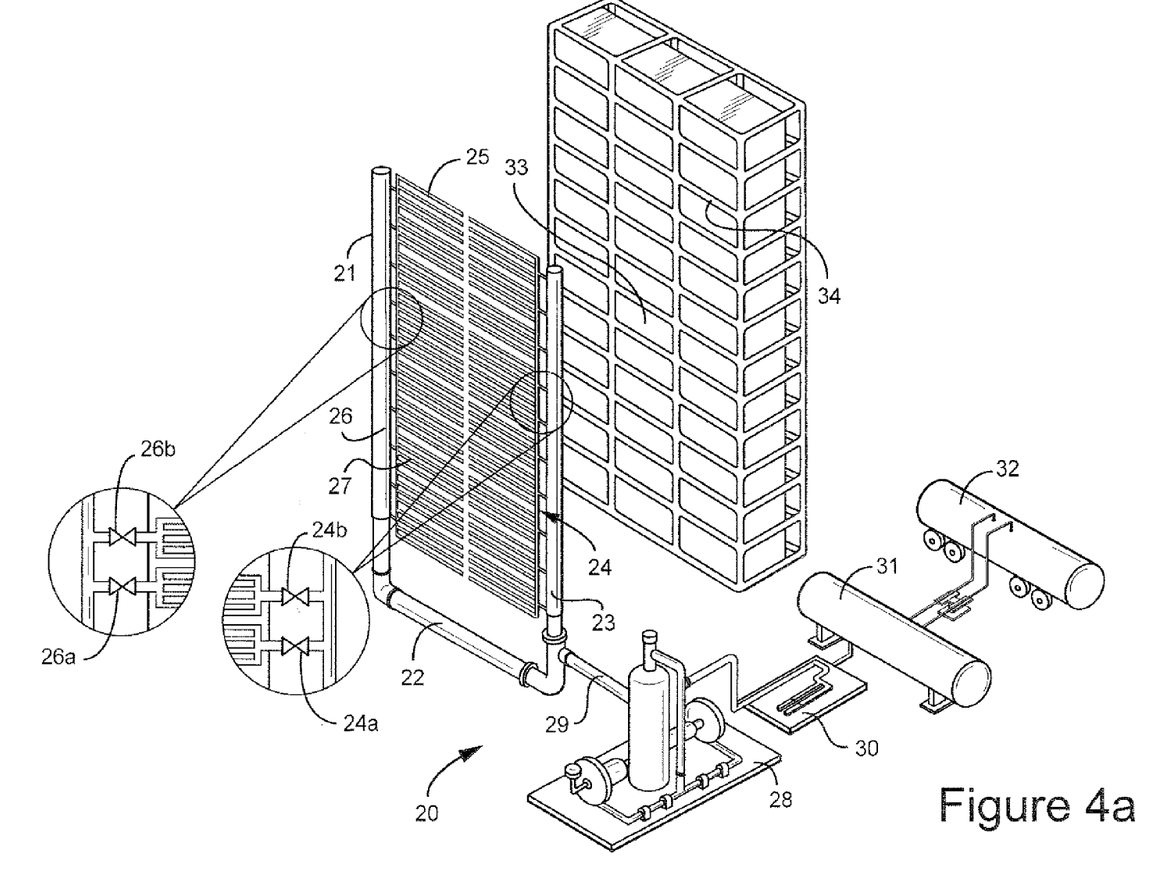
FIG. 4a shows an exemplary SCR ammonia grid and related process components used to control the amount and distribution of ammonia to treat gas turbine exhaust streams and effectively eliminate $NO_x$ using the control factors of the present invention.

FIG. 4a of the drawings illustrates an exemplary SCR, ammonia grid and process components for controlling the amount and distribution of ammonia to treat gas turbine exhaust streams according the invention, i.e., to eliminate and/or reduce the $NO_x$ levels down to acceptable levels using the model-based control factors. The SCR injection system is depicted generally as 20 and includes ammonia injection grid (AIG) 25 which comprises a U-shaped ammonia injection manifold, i.e., with parallel vertical manifold sections 21 and 23 and integral horizontal manifold section 22. AIG 25 also includes vertical ammonia headers 24 and 26 in fluid communication on one side with the U-shaped injection manifold, and with parallel sections of AIG 25 on the other side (typically forming a parallel array separated by about one to two feet).

The individual segments of AIG 25 (shown by way of example as AIG segment 27) are designed to receive an independently controlled amount of the ammonia feed, depending on the analytical results and control parameters discussed above. In this embodiment, the flow to different parallel segments of AIG 25 can be controlled through a plurality of injection ports using shutoff valves as illustrated by way of example as 24a, 24b, 26a and 26b. The individual segments of AIG 25 (for example, AIG segment 27) are thus designed to receive an independently controlled amount of the ammonia feed, depending on the analytical results and control parameters discussed above. That is, the control system adjusts the valves to each AIG segment to control the ammonia distribution. In the embodiment depicted in FIG. 4a, AIG 25 includes two major parallel grid sections with each section in fluid communication with it own vertical manifold.

In operation, aqueous liquid ammonia from tank car 32 passes through an unloading station into ammonia storage tank 31, which in turn feeds the aqueous ammonia using flow control unit 28 and pump skid 30. At that point, the liquid aqueous ammonia feed becomes vaporized by blending with hot air (the ammonia/air lean limit being less than about 15% to avoid any explosion hazard). The ammonia is fed into AIG 25 under the carefully controlled flow conditions and specific grid locations described above. Thereafter, the combined gas turbine exhaust/ammonia feed passes into a catalyst support structure 34 containing the SCR catalyst (shown generally as 33) to form selective catalytic reduction unit 34. Typically, the mixing space between AIG 25 and internal catalyst support structure 34 is about 10 to 20 feet.

Figure 4B:
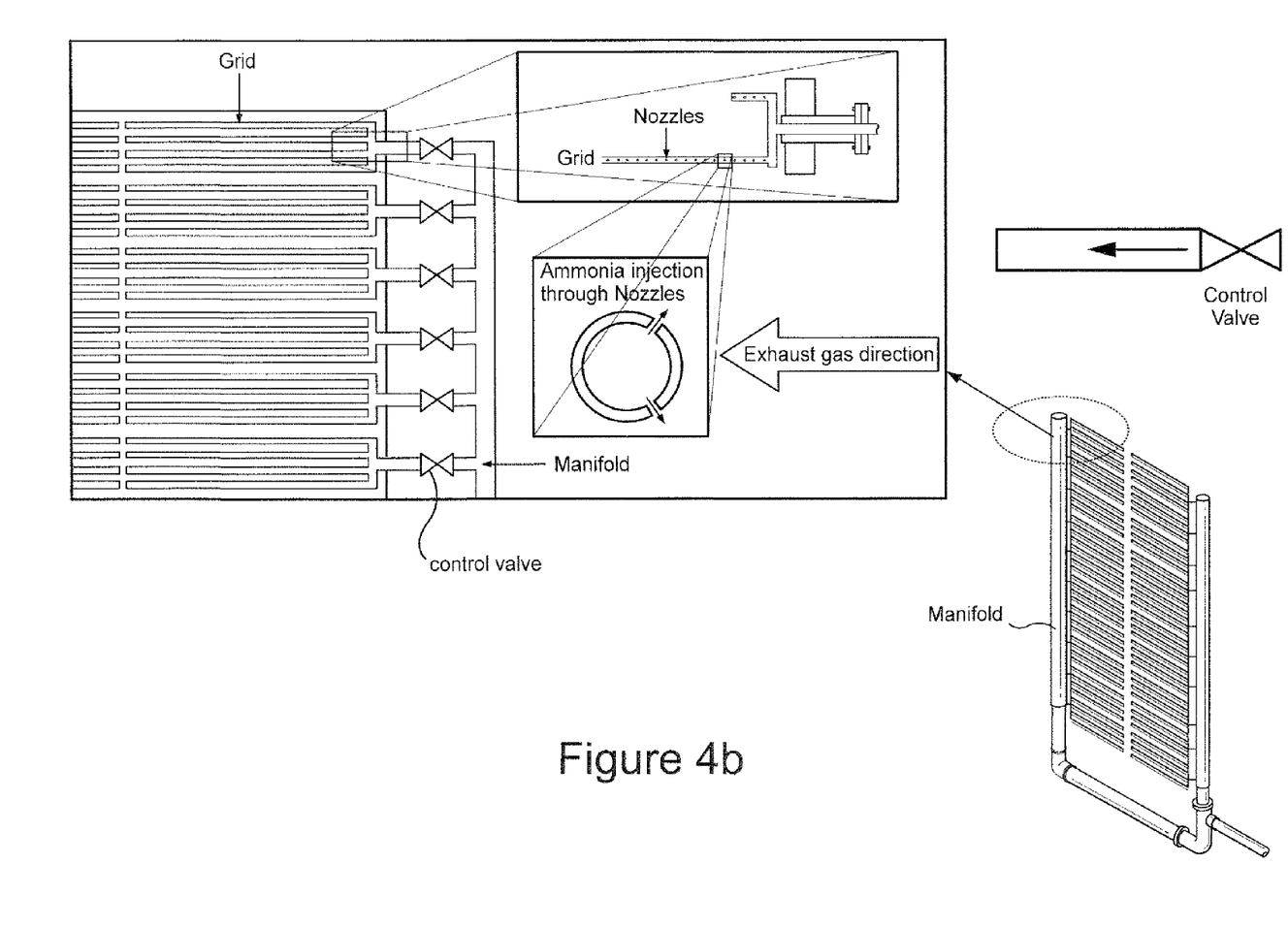
FIG. 4b shows a portion of the ammonia injection grid ("AIG") as depicted in FIG. 4a, with additional details of an exemplary valve configuration for carrying out a controlled ammonia injection process.

FIG. 4b shows a portion of the ammonia injection grid ("AIG") depicted in FIG. 4a, with additional details of an exemplary valve configuration for carrying out a carefully controlled ammonia injection process in accordance with the invention. As FIG. 4b indicates, the ammonia feed to an SCR is mixed with air upstream of the SCR catalyst using a horizontal array of parallel injection pipes (or "ports") in the form of an ammonia grid that includes a plurality of individual control valves positioned within the grid for precisely adjusting and controlling the flow of ammonia to a corresponding array of horizontal ammonia injection ports. As such, the AIG creates a much more uniform and controlled ammonia distribution in selected portions of the gas turbine exhaust stream upstream of the SCR. The actual pipe geometry, injection hole size, number of ammonia injection ports in each array and exact spacing of the injection ports in the AIG can vary depending on the grid design and the range of exhaust gas operating conditions applicable to a particular design. FIG. 4b also shows an exemplary design of the nozzles used to inject ammonia into the grid, as well as the position of individual control valves relative to the manifold and grid operable to control the distribution of ammonia based on the specific requirements of the system.

Figure 5:
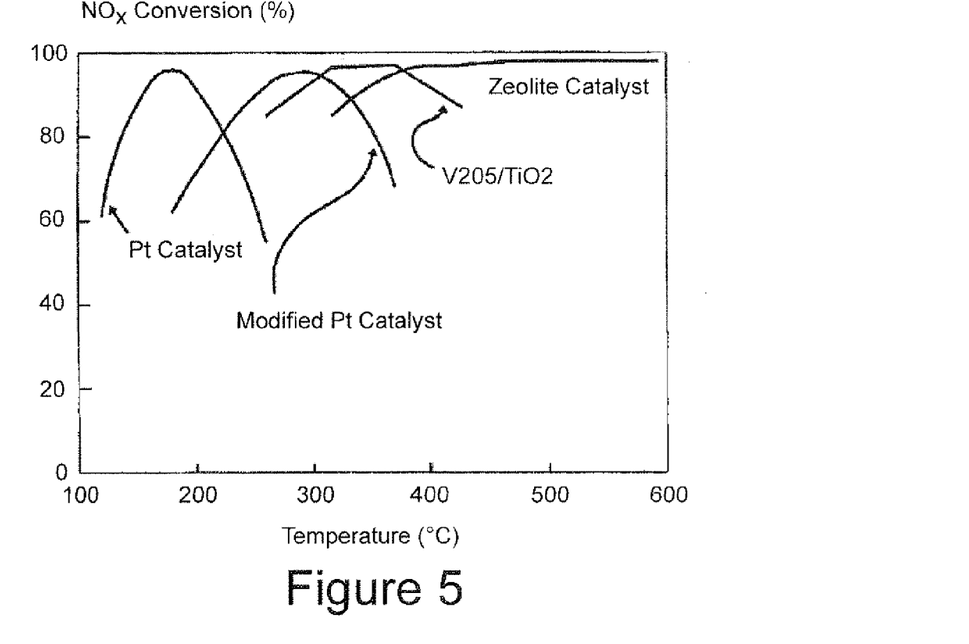
FIG. 5 is a graphical representation of SCR catalyst dependence on the gas turbine exhaust temperature showing exemplary operating windows for $NO_x$ removal using ammonia and different catalysts to achieve the control functions according to the invention.

FIG. 5 is a graphical representation showing SCR catalyst dependence on the gas turbine exhaust temperature with the percentage of $NO_x$ conversion plotted against temperature. FIG. 5 also depicts exemplary dependence of $NO_x$ conversion to $N_2$ dependence on exhaust gas temperature using ammonia and different candidate catalysts based on uniform ammonia distribution, according to the invention, namely platinum, Zeolites, $V2O5/TiO_2$ and a modified platinum catalyst. Of the various catalysts shown in FIG. 5, only Zeolites has been found unacceptable due to its lack of durability over time in treating gas turbine exhaust streams due to the presence of water vapor.

Figure 6:
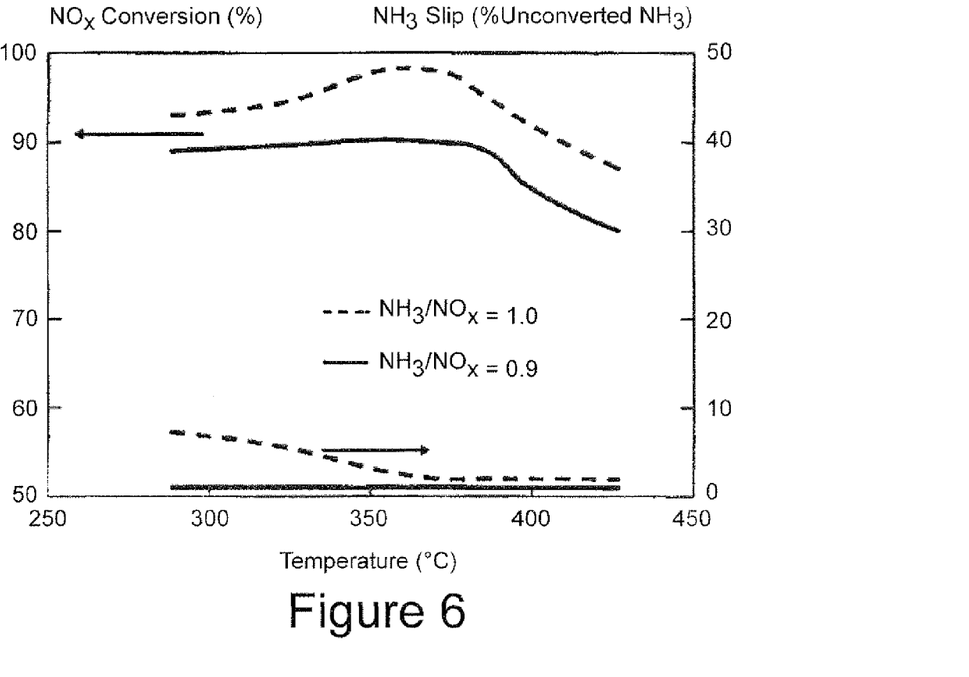
FIG. 6 is a graphical representation of $NO_x$ conversion and percent ammonia slip at different gas turbine exhaust temperatures using a known ammonia-to-$NO_x$ ratio in order to precisely control the amount of ammonia being injected.

FIG. 6 is a graphical representation of $NO_x$ conversion and percent ammonia slip at different gas turbine exhaust temperatures based on a known ammonia-to-$NO_x$ ratio for use in determining and controlling the amount of ammonia needed to reduce the $NO_x$ levels down to acceptable levels. FIG. 6 plots $NO_x$ conversion and the percentage of unreacted ammonia (ammonia "slip") against temperature for ammonia/$NO_x$ ratios of 0.9 and 1.0. The graph of FIG. 6 confirms that for a given catalyst and reactor design the amount of unconverted ammonia "slip" depends on the exhaust gas temperature and the $NH_3$ to $NO_x$ ratio. A narrow range exists over which high $NO_x$ reduction and near zero ammonia slip occurs between about 360° C. and 380° C. for this catalyst. FIG. 6 also indicates that $NO_x$ removal efficiency increases with exhaust temperature up to about 700° F. and thereafter decreases as shown.

Figure 7:
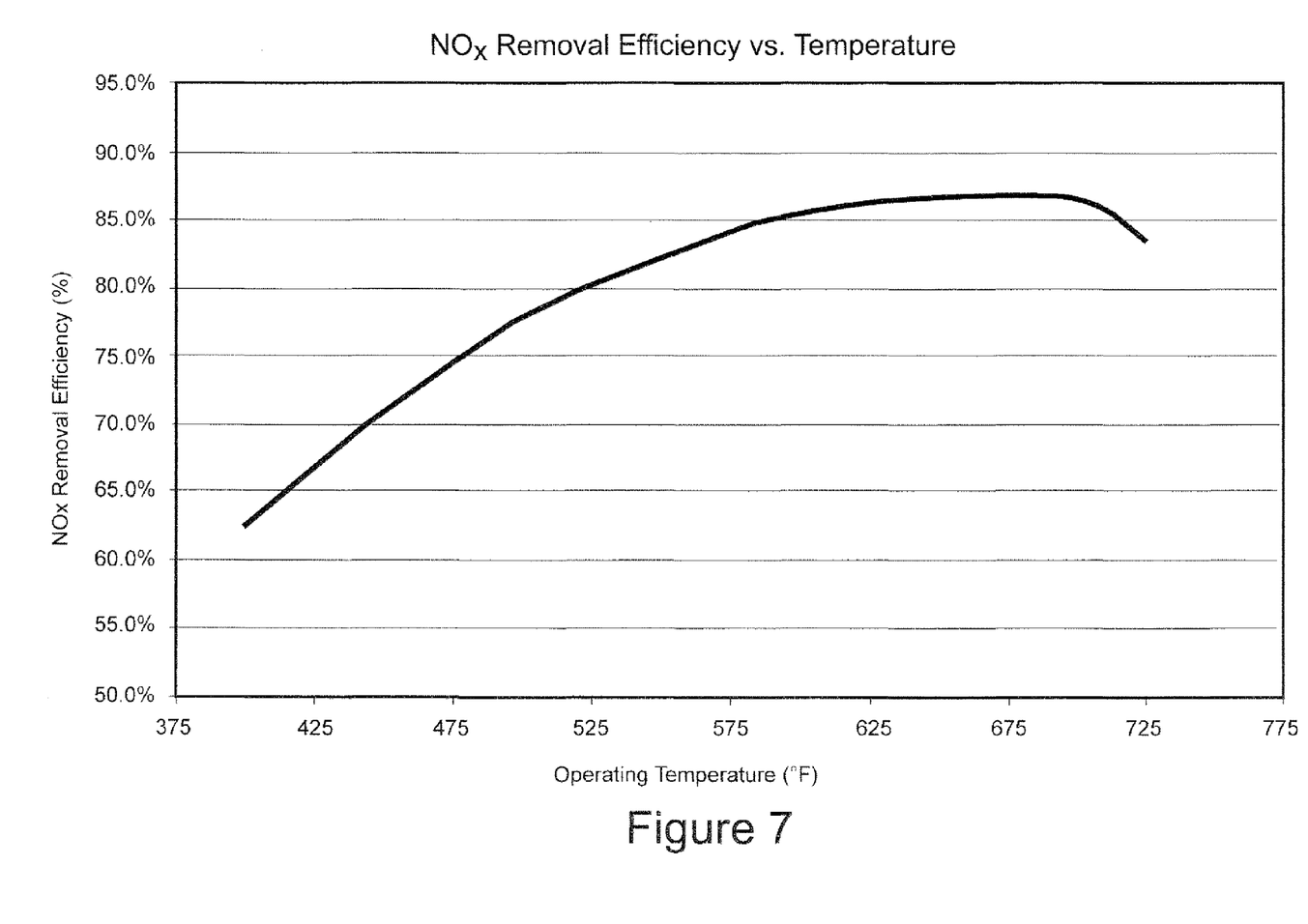
FIG. 7 shows a graphical representation of the efficiency of $NO_x$ removal at different gas turbine exhaust temperatures using a fixed exhaust gas composition and flow rate to control the ammonia feed to the SCR.

FIG. 7 is a graphical representation of the efficiency of $NO_x$ removal at different gas turbine exhaust temperatures using a fixed exhaust gas composition and flow rate to control the ammonia feed to the SCR. FIG. 7 indicates that a change in $NO_x$ removal occurs in response to modifications to the SCR inlet exhaust gas temperatures within a certain desired range. A change in flow rate has somewhat less affect on $NO_x$ reduction than the exhaust temperature. The amount of ammonia slip typically will increase over time. FIG. 7 also indicates that below 575° F. and above 700° F. the $NO_x$ removal rate decreases rapidly with decreasing exhaust temperature.

Figure 8:
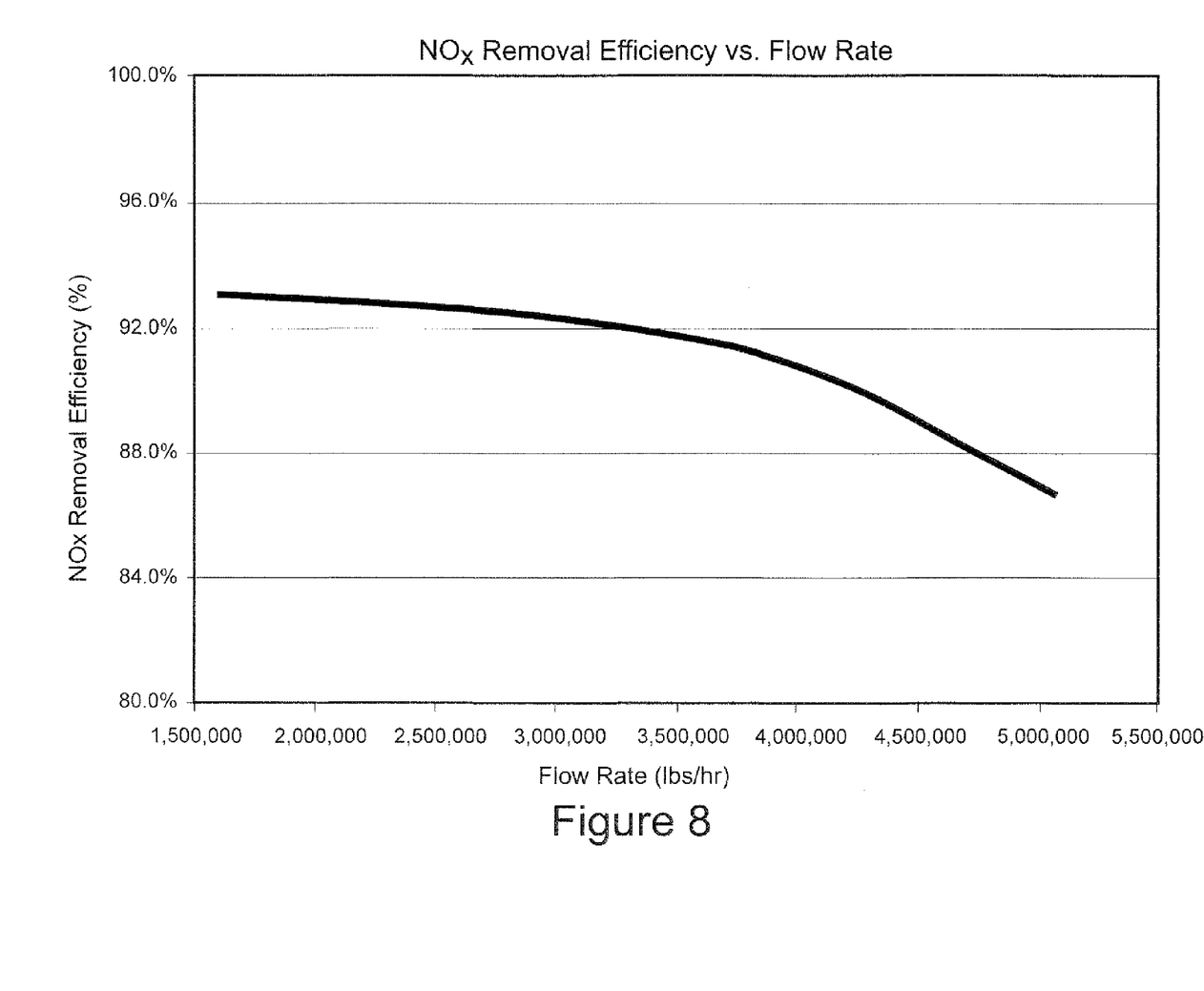
FIG. 8 graphically depicts the removal efficiency of $NO_x$ based on different gas turbine exhaust flow rates with a fixed exhaust composition and flow rate in order to control the ammonia fed to the SCR in accordance with the invention.

FIG. 8 depicts the removal efficiency of $NO_x$ based on different gas turbine exhaust flow rates using a fixed exhaust composition and flow rate as reference points in order to determine and control the ammonia feed to the SCR. The data in FIG. 8 is based on actual operating conditions with a gas turbine exhaust temperature of 696° F. and 15 ppm $NO_x$ at 15 wt. % oxygen and for a given base metal SCR catalyst. FIG. 8 thus plots the projected exhaust gas flow rate in pounds per hour against the projected $NO_x$ removal efficiency and exemplifies the type of data useful in implementing the control model according to the invention.

Figure 9:
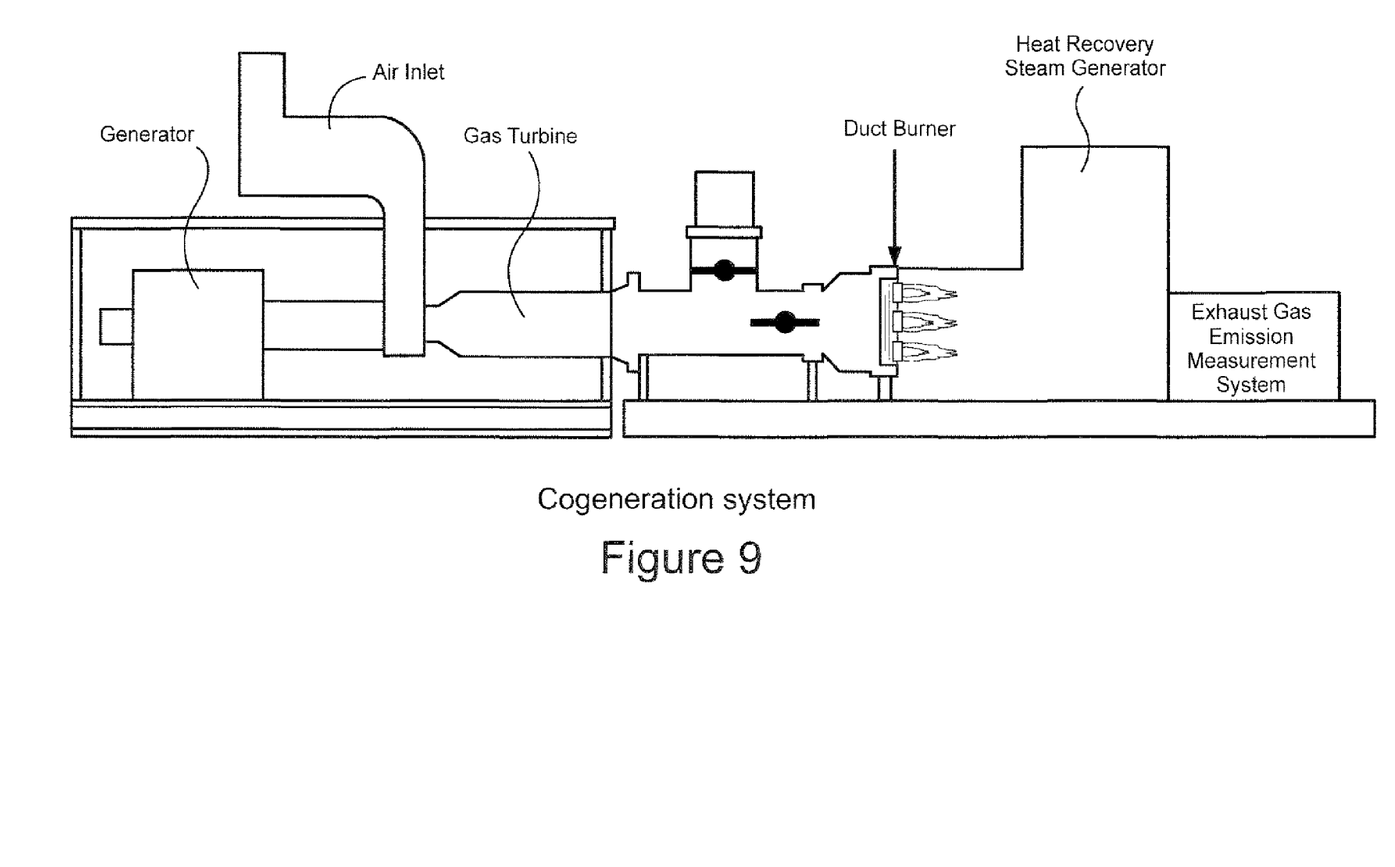
FIG. 9 shows an exemplary gas turbine "cogeneration system" with a duct burner that results in a variation of the factors used to first determine and then control ammonia injection in accordance with the invention.

Finally, FIG. 9 shows an exemplary gas turbine "cogeneration" system with a duct burner that results in a variation of the control factors and ammonia injection in accordance with the invention. That is, FIG. 9 shows the use of a duct burner downstream of the gas turbine engine and upstream of the heat recovery steam generator. As discussed above, a possibility exists that additional $NO_x$ will be generated by the duct burner that must be accounted for in determining the amount and precise location in the HRSG for a controlled ammonia injection upstream of the AIG. $NO_x$ emissions are measured near the exhaust stack exit and other locations such as before the SCR catalyst (see "Exhaust Gas Emission Measurement System" in FIG. 9).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for reducing the amount of nitrogen oxides ($NO_x$) in a combustion gas waste stream comprising the steps of:
   determining the amount of $NO_x$ present in said combustion gas waste stream;
   determining the total stochiometric amount of ammonia required to reduce the $NO_x$ concentration in said combustion gas waste stream to a required level or less;
   determining the spatial distribution of $NO_x$ components in said combustion gas waste stream at a location upstream of an ammonia injection grid;
   identifying one or more areas within said ammonia injection grid for activating one or more ammonia valves;
   injecting a controlled amount of ammonia vapor into said combustion gas waste stream at grid locations corresponding to said spatial distribution of $NO_x$ components; and
   treating said combustion gas waste gas stream with injected ammonia using selective catalytic reduction to reduce the amount of $NO_x$ to a required level or less.

2. A method according to claim 1 further comprising the steps of analyzing the gas downstream of said selective catalytic reduction to determine the amount of unreacted $NO_x$ and adjusting the amount of ammonia injected into said combustion gas waste stream.

3. A method according to claim 1, wherein said step of determining the amount of $NO_x$ present in said combustion gas waste stream includes determining the gas turbine exhaust gas feed rate upstream up said ammonia gas injection grid.

4. A method according to claim 1, wherein said step of treating said combustion gas waste gas stream with injected ammonia uses data reflecting the specific type, composition and age of catalyst in said selective catalytic reduction.

5. A method according to claim 1, wherein said combustion gas waste steam is generated by a gas turbine engine.

6. A method according to claim 1, wherein said step of injecting a controlled amount of ammonia vapor into said combustion gas waste stream uses data reflecting the position, age and open or closed status of injection ports in said ammonia injection grid.

7. A method according to claim 5, wherein said step of determining a flow rate profile of $NO_x$ components in said combustion gas waste stream uses data regarding the operating conditions and hydrocarbon fuel being burned by said gas turbine engine.

8. A method according to claim 1, further comprising the step of monitoring the temperature of said combustion gas waste steam upstream of said ammonia injection grid.

9. A method according to claim 5, further comprising the step of determining the amount of $NO_x$ contributed to said combustion gas waste stream from a duet burner downstream of said gas turbine engine.

10. A method according to claim 1, wherein said step of determining the amount of $NO_x$ present in said combustion gas waste stream includes a determination of the relative amounts and molar ratio of NO to $NO_2$.

* * * * *

UNITED STATES PATENT AND TRADEMARK OFFICE
CERTIFICATE OF CORRECTION

| | |
|---|---|
| PATENT NO. | : 7,824,636 B1 |
| APPLICATION NO. | : 12/508604 |
| DATED | : November 2, 2010 |
| INVENTOR(S) | : Kraemer et al. |

It is certified that error appears in the above-identified patent and that said Letters Patent is hereby corrected as shown below:

In the Claims:

In Claim 9 at Column 12, line 41, delete "duet burner" and insert --duct burner--

Signed and Sealed this
Fourth Day of January, 2011

David J. Kappos
*Director of the United States Patent and Trademark Office*